United States Patent [19]

Köhler et al.

[11] 4,344,799

[45] Aug. 17, 1982

[54] READILY DISPERSIBLE TIO₂ PIGMENT

[75] Inventors: Klaus Köhler; Peter Woditsch; Hilmar Rieck, all of Krefeld; Fritz Rodi, Moers, all of Fed. Rep. of Germany

[73] Assignee: Bayer Aktiengesellschaft, Leverkusen, Fed. Rep. of Germany

[21] Appl. No.: 203,010

[22] Filed: Nov. 3, 1980

[30] Foreign Application Priority Data

Nov. 17, 1979 [DE] Fed. Rep. of Germany ....... 2946549

[51] Int. Cl.³ ............................. C09C 1/32; C09C 3/00
[52] U.S. Cl. .................................. 106/300; 106/308 Q
[58] Field of Search ............................ 106/308 Q, 300

[56] References Cited

U.S. PATENT DOCUMENTS 3,025,179  3/1962  Holbein .......................... 106/308 Q
3,647,495  3/1972  Cline ............................. 106/308 Q
3,808,023  3/1974  Whitehead et al. ............. 106/308 Q

FOREIGN PATENT DOCUMENTS 1121367  7/1968  United Kingdom ........... 106/308 Q
1392189  4/1975  United Kingdom ........... 106/308 Q

*Primary Examiner*—Carl F. Dees
*Assistant Examiner*—Margaret B. Medley
*Attorney, Agent, or Firm*—Sprung, Horn, Kramer & Woods

[57] ABSTRACT

An inorganically after-treated $TiO_2$ pigment with a coating of hydrophobicizing and hydrophilicizing organic substances, which pigment comprises more than about 95% by weight of $TiO_2$, shows a loss on annealing of less than about 0.8% (after subtraction of the carbon content) and has a grindometer value smaller than about 30, corresponding to a value of more than about 5.6 on the Hegman scale, is produced by micronizing a mixture of an inorganically after-treated $TiO_2$ pigment, an untreated $TiO_2$ pigment and hydrophobicizing and hydrophilicizing organic substances, the after-treated pigment being employed in about 1 to 40% by weight of total $TiO_2$ pigment and the hydrophobicing and hydrophilicizing substances being employed in about 0.3 to 5% by weight of $TiO_2$ pigment. The pigments are readily dispersible which simplifies their use in pigmenting lacquers, plastics and paper.

6 Claims, No Drawings

READILY DISPERSIBLE TiO₂ PIGMENT

This invention relates to inorganically after-treated TiO$_2$ pigments which have a coating of organic substances rendering them hydrophobic and hydrophilic and which contain more than 95% by weight of TiO$_2$ and show a loss on annealing of less than 0.8% (after subtraction of the carbon content), with a grindometer value of less than 30, corresponding to a value of more than 5.6 on the Hegman scale.

The pigments according to the invention are distinguished by their good dispersibility and may be used to pigment lacquers, plastic materials and paper.

An important feature of high quality pigments, which is a mark of their quality, is their dispersibility. Easily dispersed pigments are distinguished by the fact that they can be uniformly distributed within a short time and with little expenditure of energy in the medium which they are required to pigment. Particularly high standards of dispersibility are required of pigments used for the preparation of lacquers by means of high speed stirrers, so-called dissolvers. In the process of pigment dispersion using dissolvers, the pigment powder is distributed in the binder by the action of relatively low shearing forces. Lacquers which have a high gloss and are free from stipples, i.e. lacquers which contain little or no agglomerations of primary pigment particles, can only be obtained if the agglomerates which are present in every pigment powder can easily be broken down.

It is therefore a special object of the present invention to provide pigments which are readily broken down for use in lacquer binders so that the technical and economical advantages of dissolvers which are increasingly used for the preparation of lacquers can be optimally utilized.

One characterizing measure given in many patent specifications for achieving this object is the after-treatment of TiO$_2$ pigments, optionally after a preliminary grinding process, in an aqueous suspension by the precipitation on these pigments of metal oxides, hydroxides and/or phosphates. After the water-soluble salts resulting from the precipitation have been removed by washing and the pigments have subsequently been dried, the process is usually completed by grinding the pigments, using pin mills, pebble mills or pendulum mills. For particularly high quality pigments, grinding is carried out in air jet or steam jet mills, and the after-treated pigment surface is treated with organic auxiliary substances before or during micronization. A disadvantage of this method is that the after-treatment process is technically very elaborate and time-consuming, and furthermore requires considerable expenditure of energy on account of the drying which must precede grinding.

It would therefore be desirable to obviate these disadvantages at least partially and yet obtain pigments with good dispersion properties.

TiO$_2$ pigments which conform to these requirements have now surprisingly been found. These are inorganically after-treated TiO$_2$ pigments which are coated with organic substances rendering them hydrophobic and hydrophilic and which contain more than 95% by weight of TiO$_2$, show a loss on annealing of less than 0.8% (after subtraction of the carbon content) and have a grindometer value of less than 30, corresponding to a value of more than 5.6 on the Hegman scale.

These TiO$_2$ pigments with good dispersibility are prepared by micronizing an inorganically after-treated TiO$_2$ pigment in quantities of from 1 to 40% by weight, preferably from 5 to 30% by weight, based on the total quantity of TiO$_2$ pigment, together with an untreated TiO$_2$ pigment and adding organic substances which render the pigment hydrophobic and hydrophilic in quantities of from 0.3 to 5% by weight, preferably from 0.5 to 1.5% by weight, based on the weight of the pigment, before or during micronization.

The present invention also provides a process for the preparation of the described TiO$_2$ pigments, characterized in that a TiO$_2$ pigment which has not received an inorganic chemical after-treatment is micronized together with an inorganically after-treated TiO$_2$ pigment and substances which render the pigment hydrophobic and hydrophilic are added before or during micronization.

According to the invention, the TiO$_2$ pigment which has not been inorganically after-treated is micronized together with the after-treated TiO$_2$ pigment. In a preferred embodiment of the invention, the after-treated pigment is added dry to the untreated pigment before micronization, but the two pigments can also be introduced simultaneously into the jet mill by means of a suitable device without first being mixed. If the pigments are to be mixed, this may be carried out in any suitable apparatus for mixing solids, e.g. mixing drums, screws, etc. Any untreated types of pigment available in a solid form are suitable for the preparation of the pigments according to the invention by the process according to the invention, regardless of the method by which they have been prepared.

It is preferred to use TiO$_2$ furnace clinker prepared by the so-called sulphate process. In order to ensure that the process according to the invention will be carried out as economically as possible, the clinker is mixed with the after-treated TiO$_2$ pigment and micronized without being first size-reduced.

TiO$_2$ pigments prepared by the chloride process may also be used according to the invention.

According to a preferred embodiment of the process for preparing the TiO$_2$ pigments, only from 1 to 40% by weight, preferably from 5 to 30% by weight, of inorganically after-treated TiO$_2$ pigment is used for preparing the TiO$_2$ pigment mixtures according to the invention, and this pigment is one which has been after-treated with from 1 to 20% by weight, preferably from 3 to 15% by weight, based on TiO$_2$, of inorganic metal oxides, hydroxides and/or phosphates. In another preferred embodiment of the process according to the invention, the total quantity of organic compounds which render the pigments hydrophobic and hydrophilic is from 0.3 to 5% by weight, preferably from 0.5 to 1.5% by weight, based on the weight of the pigment.

The hyrophobicizing organic auxiliary substances are preferably organic silicon compounds and/or organic phosphorus compounds. The term "hydrophobicizing" does not mean that a hydrophobic character is inevitably imparted to the surface of oxidic pigments, which is by nature hydrophilic, if the process according to the invention is carried out. It merely describes the characteristic feature of these compounds, which is that, when they are applied in a sufficiently large quantity to the pigment surface, they are capable of imparting hydrophobic characteristics to this surface.

Polysiloxanes have proved to be particularly suitable organic silicon compounds. They may be straightchained, branched-chained or cyclic polysiloxanes containing the following units, optionally in an alternating arrangement:

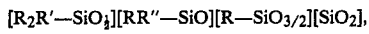

$[R_2R'-SiO_{\frac{1}{2}}][RR''-SiO][R-SiO_{3/2}][SiO_2]$, wherein R may denote an alkyl, cycloalkyl, aryl or alkenyl group, R' may be identical to R or OH, R'' may be identical to R or may be H, and the number of Si atoms is greater than 5.

Examples of such polysiloxanes include [SiMe$_3$]-endblocked linear polyhydrogen methyl siloxanes, preferably with average chain lengths of from 10 to 50 [SiHMeO] units. Partially hydrogenated polysiloxanes of the type described above are also suitable, particularly those having 5 [SiHMeO] units and 5 [SiMe$_2$O] units. Polyvinyl hydrogen methyl siloxanes end-blocked with [SiHMe$_2$] are also particularly suitable, especially those having 5 [SiHMeO] and 3 [Si(CH=CH$_2$)MeO] units. Branched chain polyhydrogen siloxanes constitute another preferred class of compounds, e.g. a [SiHMe$_2$]-end-blocked single branched permethylated polysiloxane having 9 [SiMe$_2$O] units.

Polysiloxanes with OH end groups of the type obtainable as definite fractions of the hydrolyzates of, for example, the following compounds are also suitable: dimethyldichlorosilane; dimethyldichlorosilane and methyltrichlorosilane; dimethyldichlorosilane and silicon tetrachloride; vinyl methyl dichlorosilane; vinyl methyl dichlorosilane and dimethyldichlorosilane; cyclohexyl methyldichlorosilane and methyl dichlorosilane, etc. Condensation products of diphenylsilane diol are also suitable.

Particularly suitable polymethylsiloxanes include, for example, linear polymethylsiloxanes end-blocked with SiOH and having an average molecular weight of 490 and a viscosity of 27 cP, and SiOH-end-blocked linear polyvinyl methylsiloxanes having an [MeSiViO] content of 5%, an [SiOH] content of 18.2% and a viscosity of 25.5 cP. SiOH-end-blocked branched-chain polymethylsiloxanes having an average molecular weight of 545 and a viscosity of 110 cP, and SiOH-end-blocked branched-chain polyvinyl methyl siloxanes having an [MeSiViO] content of 5%, an [SiOH] content of 15.2% and a viscosity of 95 cP are also suitable.

It is also particularly advantageous to use phosphoric acid diesters corresponding to the formula:

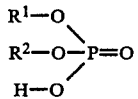

as hydrophobicizing organic substances. In this formula, R$^1$ and R$^2$ denote identical or different alkyl, aryl, cycloalkyl and/or alkenyl groups.

Trialkanolamines containing up to 4 carbon atoms per alkyl moiety are particularly suitable hydrophilicizing organic compounds, e.g. triethanolamine, tripropanolamine and/or triisopropanolamine. These compounds and their use with siloxanes is described in greater detail in German Application No. P 29 24 849.5, filed June 29, 1979 and German Application No. P. 29 24 850.8, filed June 20, 1979, the disclosures of which are incorporated herein by reference.

The fact that only relatively small quantities of after-treated pigments are required for the pigments according to the invention clearly demonstrates that the process according to the invention provides an extremely simple and inexpensive method of preparing readily dispersible TiO$_2$ pigments consisting predominantly of TiO$_2$ pigments which have not been inorganically treated.

Since only a fraction of the micronized end product has been subjected to the technically expensive and time-consuming inorganic after-treatment, one of the major savings achieved is the considerable saving in energy which would otherwise be required for drying the after-treated products. In spite of this, the pigments obtained do not differ in their dispersibility from after-treated TiO$_2$ pigments.

The proportion of hydrophobicizing to hydrophilicizing organic substances added during the process of micronization may be varied within wide limits. For pigmenting lacquer binders, which will be described below with the aid of the example of dissolver dispersion in an alkyd resin to demonstrate the ease of dispersibility of the pigments according to the invention, the proportion of hydrophobicizing to hydrophilicizing component when polysiloxanes are used is preferably within the range of about 1:2 to 1:5, whereas when phosphoric acid diesters are used, proportions within the range of about 3:1 to 1:3 are preferred.

For pigmenting other systems, different proportions may be chosen to obtain optimum results.

It is known that the desired products with good dispersibility are not obtained by simply mixing the starting materials used according to the invention, even if the untreated TiO$_2$ pigment and the inorganically after-treated TiO$_2$ pigment are both in a micronized form.

The TiO$_2$ pigments according to the invention, on the other hand, which require only a small proportion of the usual quantities of inorganically after-treated TiO$_2$ pigment for their preparation, have the same dispersibility as an after-treated TiO$_2$ pigment.

The TiO$_2$ pigments according to the invention are particularly suitable for pigmenting lacquers, plastics materials and paper.

The dispersibility of the TiO$_2$ pigments is tested in accordance with the regulations described below. To determine the dispersibility in lacquer binders, the pigment is dispersed by means of a dissolver. It is dispersed in a highly viscous binder-solution mixture of 60% alkyd resin (fatty acid-modified alkyd resin, oil length 26) in xylene under the following conditions:

100 g of the alkyd resin (60% in xylene) are weighed into a 250 ml tinplate container with pressurized lid and 74 mm in diameter. 140 g of TiO$_2$ pigment are slowly strewn into the alkyd resin while the resin is stirred by means of the dissolver (diameter of disc 40 mm, distance from bottom of stirrer vessel 20 mm) at 500 to 1600 revs/min. The edge of the container and the stirrer are stripped off so that any pigment which has not been wetted is mixed with the ground pigment, and the pigment is then dispersed for 5 minutes at 5000 revs/min. Testing for the presence of oversize particles (stipples):

138.5 g of pigment paste are diluted with 20 g of crystal oil 60/xylene (1:1) in a plastic beaker and immediately stirred vigorously by hand, and the granularity is then determined with a grindometer (DIN 53 203).

Gloss:

25 g of pigment paste are lacquered with 8.5 g of alkyd resin (60% in xylene) in a plastic beaker and diluted with a further 10 g of xylene. The lacquer is then drawn out on glass plates using a film drawer with a gap of 60 μm width. The lacquer is left to dry at room temperature for 2 hours and the gloss is then measured using a gloss meter at an angle of 20°.

Material properties:

The pigments described by way of example are characterized by their TiO2 content and their loss on annealing (3 hours at 900° C.) calculated after subtraction of the C content found. The dry loss is determined according to DIN 53 198.

The pigments according to the invention and their preparation according to the invention are described below by way of example:

EXAMPLE 1

A rutile TiO2 furnace clinker prepared in the usual manner by the so-called sulphate process is briefly mixed in a drum with 15% by weight, based on the total quantity, of a TiO2 pigment which has been after-treated with 0.8% SiO2 and 2.5% Al2O3 by a conventional method and dried. The mixture is sprayed with 0.25% by weight, based on the weight of the mixture, of an α,ω-polysiloxanediol mixture, having an average molecular weight of 490 and a viscosity of 27 cP, and 0.75% by weight of triethanolamine, and the product is then micronized in a steam jet mill. The product is of excellent quality for dispersion (see Table 1). Analysis: TiO2 96.9%; Loss on annealing 0.6%; C,O. 19%; Loss on annealing—C; 0.41%; Dry loss 0.07%.

COMPARISON EXAMPLE A

This Example serves to show that a TiO2 pigment which has not been inorganically after-treated is of inferior quality for dispersion if it is micronized in conventional manner in the presence of organic auxiliary substances such as triethanolamine. The rutile TiO2 furnace clinker is used in Example 1 is sprayed with 1% by weight of triethanolamine and micronized as in Example 1. Table 1 shows that the pigment is to be classified as of poor dispersibility.

COMPARISON EXAMPLE B

This example serves to show that polysiloxanes, which have also been mentioned in the literature as auxiliary agents for improving the dispersibility of TiO2 pigments, are also unable to produce an untreated TiO2 pigment with good dissolver dispersibility. A furnace clinker as described in Example 1 is sprayed with 1% by weight of a polymethyl hydrogen siloxane having the following average overall formula:

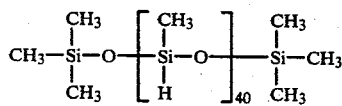

and micronized as in Example 1. The resulting pigment is of poor dispersibility (see Table 1).

COMPARISON EXAMPLE C

A commercial TiO2 pigment which has not been after-treated inorganically is tested for its dissolver dispersibility. It is found to have poor dispersibility (see Table 1).

COMPARISON EXAMPLES D AND E

Two commercial after-treated TiO2 pigments are subjected to the same test conditions. They are both readily dispersible (see Table 1). This serves to demonstrate the quality of dispersibility which can be obtained with after-treated TiO2 pigments, and to show that the pigments according to the invention conform to this quality.

Analysis for D: TiO2, 93.1%; Loss on annealing, 1.24%; C, 0.26%; Loss on annealing—C, 0.98%; Dry loss, 0.17%. Analysis for E: TiO2, 95.9%; Loss on annealing, 1.13%; C, 0.20%; Loss on annealing—C, 0.93%; Dry loss, 0.15%.

EXAMPLE 2

A TiO2 furnace clinker similar to that of Example 1 is mixed with 20% by weight of the after-treated and dried TiO2 pigment used in Example 1 and sprayed with 0.2% by weight of a polymethyl hydrogen siloxane corresponding to the following average overall formula:

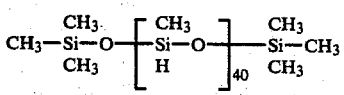

and 0.4% by weight of triethanolamine. A pigment with good dissolver dispersibility (see Table 1) is obtained after micronization carried out as in Example 1.

Analysis: TiO2, 97.2%; Loss of annealing, 0.7%; C, 0.20%; Loss on annealing—C, 0.5%; dry loss, 0.05%.

EXAMPLE 3

A TiO2 furnace clinker corresponding to that of Example 1 is mixed with 15% by weight of a TiO2 pigment which has been after-treated by a conventional method with 9.5% by weight of SiO2 and 4% by weight of Al2O3 and dried, and the mixture is then sprayed with 0.25% by weight of an α,ω-polysiloxanediol mixture, having an average molecular weight of 490 and a viscosity of 27 cP, and 0.75% of triethanolamine, and the pigment is then micronized as in Example 1. The product is very readily dispersible (see Table 1).

Analysis: TiO2, 95.6%; Loss on annealing, 1.07%; C, 0.35% Loss on annealing—C, 0.72%; Dry loss, 0.06%.

EXAMPLE 4

The procedure is the same as in Example 3 except that the after-treated product is in a micronized form. The pigment can readily be dispersed with a dissolver (see Table 1).

Analysis: TiO2, 95.6%; Loss on annealing, 0.89%; C, 0.36%; Loss on annealing—C, 0.53%; Dry loss, 0.1%.

EXAMPLE 5

The procedure is the same as in Example 4 except that the pigment is sprayed with 0.2% by weight of the organic silicon compound and 0.4% by weight of triethanolamine. The pigment is readily dispersible, as can be seen from Table 1.

Analysis: TiO2, 95.8%; Loss on annealing, 0.81%; C, 0.23%; Loss on annealing—C, 0.58%; Dry loss, 0.1%.

EXAMPLE 6

The procedure is the same as in Example 3, except that only 10% by weight of the after-treated and dried TiO2 pigment are added and the organic auxiliary substances with which the pigment is sprayed consist of 0.67% by weight of di-2-ethyl-hexylphosphate and 0.33% by weight of triethanolamine. A readily dispersible pigment is obtained after micronization (see Table 1).

Analysis: $TiO_2$, 96.1%; Loss on annealing, 1.02%; C, 0.50%; Loss on annealing—C, 0.52%; Dry loss, 0.09%.

EXAMPLE 7

The procedure is the same as in Example 3, except that the organic auxiliary substances used for spraying the pigment consist of 0.5% by weight of di-2-ethylhexylphosphate and 0.5% by weight of triethanolamine. The pigment obtained after micronization is readily dispersible (see Table 1).

Analysis: $TiO_2$, 95.6%; Loss on annealing, 1.11%; C, 0.49%; Loss on annealing—C, 0.62%; Dry loss, 0.13%.

EXAMPLE 8

A $TiO_2$ furnace clinker similar to that of Example 1 is mixed with 15% by weight of a $TiO_2$ pigment which has been after-treated with 3.0% by weight of $Al_2O_3$ in conventional manner and dried, and the mixture is then sprayed with 0.25% by weight of an $\alpha,\omega$-polysiloxanediol mixture having an average molecular weight of 490, the viscosity being 27 cP, and 0.75% by weight of triisopropanolamine, and micronized as in Example 1. The product is readily dispersible (see Table 1).

Analysis: $TiO_2$, 97.2%; Loss on annealing, 0.47%; C, 0.17%; Loss on annealing—C, 0.30%; Dry loss, 0.06%.

EXAMPLE 9

The procedure is the same as in Example 8, except that 30% of the after-treated products are added and the pigment is sprayed with 0.18% by weight of the organic silicon compound and 0.54% by weight of triisopropanolamine (see Table 1).

Analysis: $TiO_2$, 96.9%; Loss on annealing, 0.56%; C, 0.22%; Loss on annealing—C, 0.34%; Dry loss, 0.05%.

EXAMPLE 10

A $TiO_2$ furnace clinker similar to that of Example 1 is mixed with 15% by weight of the $TiO_2$ pigment from Example 1, which has been after-treated with $SiO_2$ and $Al_2O_3$, and the mixture is sprayed with 0.67% by weight of dibutylphosphate and 0.33% by weight of triisopropanolamine and micronized as in Example 1. (see Table 1).

Analysis: $TiO_2$, 96.9%; Loss on annealing, 0.8%; C, 0.31%; Loss on annealing—C, 0.49%; Dry loss, 0.18%.

TABLE 1

| Serial No. | According to Example | Grindometer value [μ] | Hegman value | Gloss [%] |
|---|---|---|---|---|
| 1 | 1 | 10 | 7.2 | 81 |
| 2 | A | 60 | 3.2 | 55 |
| 3 | B | 100 | 0.0 | 40 |
| 4 | C | 80 | 1.6 | 40 |
| 5 | D | 10 | 7.2 | 74 |
| 6 | E | 10 | 7.2 | 83 |
| 7 | 2 | 25 | 6.0 | 76 |
| 8 | 3 | 10 | 7.2 | 75 |
| 9 | 4 | 10 | 7.2 | 78 |
| 10 | 5 | 15 | 6.8 | 68 |
| 11 | 6 | 10 | 7.2 | 82 |
| 12 | 7 | 10 | 7.2 | 78 |
| 13 | 8 | 10 | 7.2 | 82 |
| 14 | 9 | 20 | 6.4 | 80 |
| 15 | 10 | 10 | 7.2 | 80 |

It will be understood that the specification and examples are illustrative but not limitative of the present invention and that other embodiments within the spirit and scope of the invention will suggest themselves to those skilled in the art.

What is claimed is:

1. An inorganically after-treated $TiO_2$ pigment with a coating of hyrophobicizing and hydrophilicizing organic substances, which pigment comprises more than about 95% by weight of $TiO_2$, shows a loss on annealing of less than about 0.8% (after subtraction of the carbon content) and has a grindometer value smaller than about 30, corresponding to a value of more than about 5.6 on the Hegman scale, the hydrophobicizing organic substance being an organic silicon compound and/or an organic phosphorus compound and the hydrophilicizing organic compound being an amino alcohol.

2. A $TiO_2$ pigment according to claim 1, wherein the organic silicon compound is a polysiloxane.

3. A $TiO_2$ pigment according to claim 1 wherein the organic phosphorus compound is a phosphoric acid diester.

4. A $TiO_2$ pigment according to claim 1, produced by micronizing a mixture of an inorganically after-treated $TiO_2$ pigment, an untreated $TiO_2$ pigment and hydrophobicizing and hydrophilicizing organic substances, the after-treated pigment being employed in about 1 to 40% by weight of total $TiO_2$ pigment and the hydrophobicizing and hydrophilicizing substances being employed in about 0.3 to 5% by weight of total $TiO_2$ pigment.

5. A $TiO_2$ pigment according to claim 4, wherein the inorganically after-treated $TiO_2$ pigment is a $TiO_2$ pigment which has been after-treated with about 1 to 20% by weight based on $TiO_2$, of an inorganic metal oxide, hydroxide and/or phosphate.

6. A $TiO_2$ pigment according to claim 4, wherein the inorganically after-treated $TiO_2$ pigment is a $TiO_2$ pigment which has been after-treated with about 3 to 15% by weight of total $TiO_2$ pigment and the hydrophobizing and hydrophilicizing substances being employed in about 0.5 to 1.5% by weight of total $TiO_2$ pigment, the hydrophobicizing substances comprising polysiloxane or a phosphoric acid diester and the hydrophilicizing substance comprising an amino alcohol.

* * * * *